Patented Feb. 4, 1930

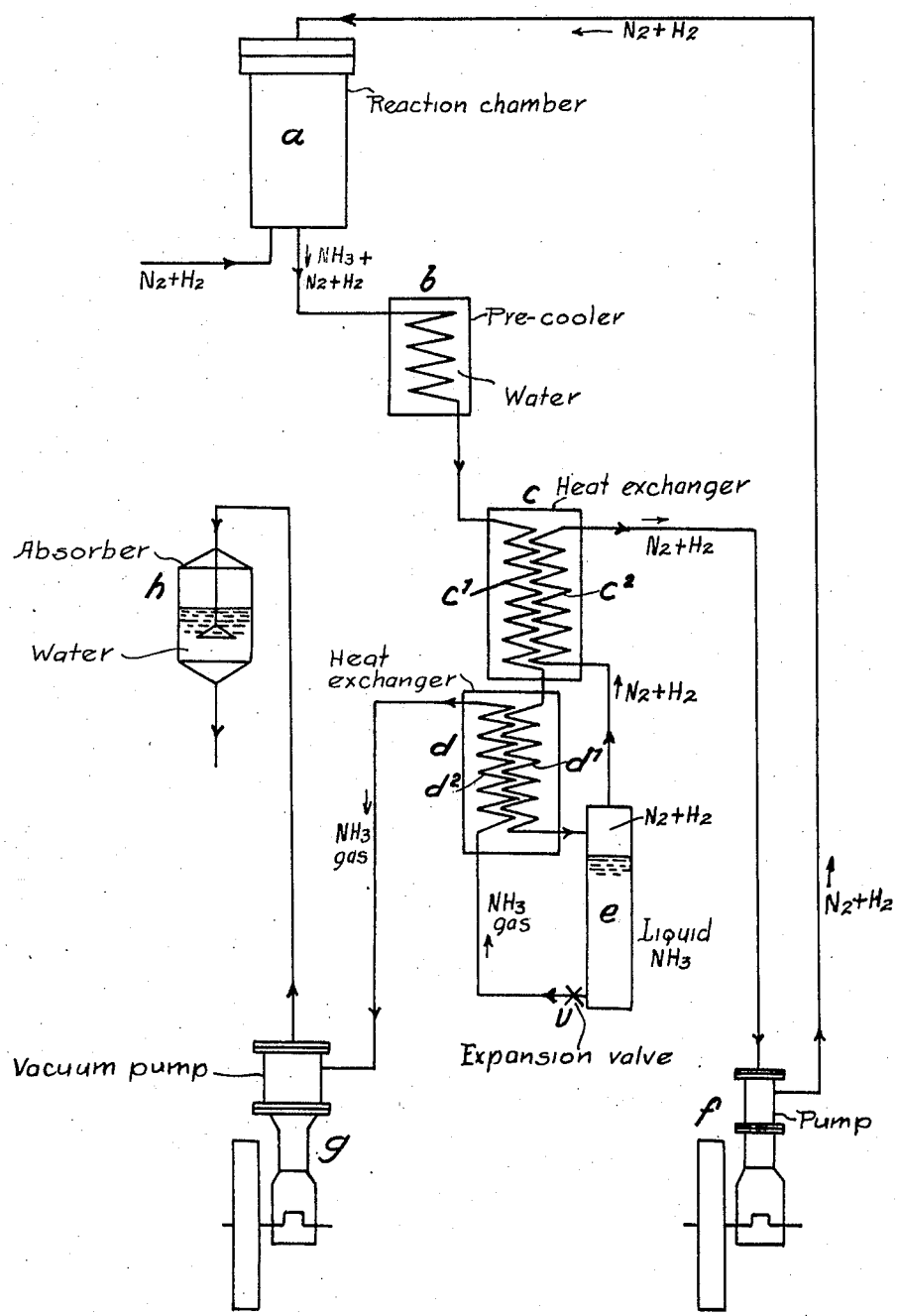

1,745,730

UNITED STATES PATENT OFFICE

GEORG FRIEDRICH UHDE, OF BOVINGHAUSEN, GERMANY

METHOD OF SEPARATING AMMONIA FROM GASES AND MIXTURES OF GASES CONTAINING AMMONIA

Application filed June 13, 1927, Serial No. 198,645, and in Germany June 15, 1926.

In executing the synthesis of ammonia from nitrogen and hydrogen under pressure, the ammonia obtained is usually eliminated from the current of gas by washing the gas, while under pressure, with water. This mode of execution is only feasible in cases where catalysts are employed in the synthesis, upon which the water vapor contained in the washed gas does not exercise any detrimental effect, because the washed gas, that is, uncombined nitrogen and hydrogen, must again be conducted into the catalyzing process.

Hitherto it was usual to separate the ammonia from the gas under pressure by cooling down the latter to the temperature of the surrounding atmosphere or somewhat therebelow and conducting the remaining gas back again into the catalyzing process. In view of the high percentage of ammonia still contained in the remaining gas returned to the process, the formation of further quantities of ammonia in passing the gases over the catalyst was no' favorable. Assuming for instance that the equilibrium has been reached, only the difference between the quantity of ammonia, corresponding to the equilibrium and the quantity of ammonia, already present in the reactive gas mixture can be formed.

Actually, it has been shown by Larson and Black (Journal of the American Chemical Society—1925) that the vapor tension of ammonia at elevated pressures, in the neighborhood of 100 atmospheres, is very high, as much as six times the vapor tension under normal conditions. This means that in an ammonia-nitrogen-hydrogen mixture at normal temperature and under a hundred atmospheres pressure, the concentration of gaseous ammonia is as much as 3 to 4 percent by volume. Therefore, return of the gaseous mixture to the catalyst does not result in an equilibrium conversion of the available nitrogen and hydrogen because 30 to 50% of the ammonia in the catalyzed gas under equilibrium conditions is already present in the initially returned gas. Therefore, but 50 to 70% by volume of the ammonia which could be produced is actually produced. The problem of completely separating produced ammonia from the gases containing the same is therefore an important problem in this art.

I have found that, in order to completely remove produced ammonia, the gases must be cooled far below normal temperatures and my invention relates to processes of so cooling the gases.

According to the method of the present invention, the evaporation-heat of the ammonia separated in the liquid state is utilized for the purpose of cooling down and condensing the gases. This is effected in such a manner, that first the incompletely separated liquid ammonia from the precooled mixture of gas is eliminated from the mixture of gas for instance in a suitable vessel, thereafter the ammonia is expanded to normal pressure and fed to meet the arriving reaction-gas mixture for the exchange of heat in a heat exchanger. In this manner the arriving gases, previously cooled down by water to normal temperature, are further cooled to minus 33 degrees C. The content of the ammonia remaining in the gases is correspondingly lowered. If desired a greater quantity of ammonia may intentionally be added to the gas mixture which is to be cooled.

Of course the low temperature of the gas freed from ammonia may be utilized to precool the arriving gas in a heat exchange-system.

By the present invention a further important progress is thereby obtained, in that the above mentioned separated liquid ammonia may be expanded into an evacuated heat exchange-system. In this manner the cooling action and therefore also the separation of the ammonia from the gas mixture under pressure may be greatly improved. In this manner it is possible to obtain a temperature of minus 70° C. in the gas outflowing from the catalysts, i. e. nearly to the freezing point of the ammonia from the gas-mixture to such an extent that but 0.1 to 0.3 per cent of ammonia by volume remains in the gases returned to the catalyst.

During the re-passage of the gas-mixture of nitrogen and hydrogen so far freed from ammonia that it contains only 0.1 to 0.3 percent of ammonia by volume over the catalyst a considerably higher efficiency is obtained. Assuming that nearly 10 volume-percent of ammonia are produced after a single passage of the gas mixture over the catalyst, 97 to 99% of the equilibrium quantity of ammonia are produced during the re-passage of the gases over the catalyst. On the other hand only 60–70% of ammonia could be newly produced in passing the gas mixture over the catalyst according to the old method, in which the remaining gas mixture still contains 3 to 4 volume-percent. It could not be expected that it was possible to succeed in this simple and before all so less expensive way to free the gas mixture going out from the catalyst so far from ammonia.

For a better understanding the single steps of the method are more clearly illustrated in the annexed drawing, diagrammatically showing a plant adapted for the execution of the new method.

First the gas mixture under pressure containing ammonia is cooled by a preliminary cooling with water. For this purpose the gas leaving the catalyst-furnace $a$ and containing ammonia is cooled in a cooling vessel $b$ by means of water, surrounding the coil provided in the vessel $b$, so that a partial quantity of ammonia is separated. The gas still charged with ammonia is then led through the heat-exchanger $c$ and $d$ passing through the pipe-coils $c'$ and $d'$. The separated ammonia is collected in the vessel $e$. This liquid ammonia is exhausted at the bottom of the vessel $e$ by means of a valve $v$ and expanded behind the said valve in a pipe-conduit into which the coil $d^2$ is inserted and which leads to the vacuum-pump $g$, so that in this branch of the pipe conduit gaseous ammonia is under vacuum. This cold ammonia is led in counter-current heat exchange relationship with the gas arriving through the coil $d^1$; in this manner the arriving gas and the ammonia separated therefrom are constantly cooled, so that finally the liquid ammonia collected in the vessel $e$ has a temperature from minus 60 to 70 centigrades. This temperature automatically results by vaporizing the ammonia in the vacuum as above described. In this manner a mixture of gas having a temperature from minus 60 to 70 centigrades accumulates in the vessel $e$, likewise transmitting its cold to the gas arriving through the coil $c'$ in the exchanger $c$ traversing the latter through the coil $c^2$ thereby increasing the cooling action. The reactive gas leaving the vessel $e$ at its top and consisting of nitrogen and hydrogen is thereby rendered nearly free from ammonia, because the gas-mixture contains at a temperature of minus 70 centigrades in average only 0.1 to 0.15 volume percent of ammonia. The pump $f$ serves to conduct the gas freed or nearly freed from ammonia again into the furnace $a$ for the purpose of further reaction. The ammonia leaving the vacuum-pump $g$ is led to the point of use, i. e. to the saturation-vessel $h$.

I claim:

1. In the process of synthesizing ammonia from mixtures of the formative gases, the method of separating ammonia from the gaseous reaction products which comprises, pre-cooling the gases while under pressure to ordinary temperature, passing the pre-cooled gases into heat exchange relationship with cold nitrogen and hydrogen separated from previously cooled quantities of the reaction gases, the heat exchange being carried out substantially in the absence of any heat exchange relationship with ammonia, then passing the reaction mixture into heat exchange relationship with cold gaseous ammonia obtained from the vaporization under low pressure of liquid ammonia separated from previously cooled quantities of the reaction gases, the heat exchange with ammonia being carried out substantially in the absence of any heat exchange relationship with the nitrogen-hydrogen mixture, whereby the ammonia in the reaction gases is liquefied, collecting the liquefied ammonia, returning the nitrogen and hydrogen separated therefrom into heat exchange relationship with further quantities of pre-cooled gases, vaporizing the liquid ammonia under low pressure, and conducting the cold vaporized ammonia having a temperature between minus 60° and 70° C. into heat exchange relationship with further quantities of reaction gases to be cooled.

2. In the process of synthesizing ammonia from mixtures of the formative gases, the method of separating the produced ammonia from the gaseous reaction mixture, which comprises passing the reaction mixture into heat exchange relationship with cold nitrogen-hydrogen mixture separated from previously cooled quantities of reaction gases, the heat exchange being carried out substantially in the absence of any heat exchange relationship of the reaction mixture with ammonia and then passing the reaction mixture into heat exchange relationship with cold gaseous ammonia obtained from the vaporization under low pressure of liquid ammonia, at a temperature close to freezing point of ammonia which is separated from previously cooled quantities of the reaction mixture, the heat exchange with ammonia being carried out substantially in the absence of any heat exchange relationship of the reaction mixture with the nitrogen-hydrogen mixture.

3. Method of separating ammonia from gaseous nitrogen-hydrogen mixtures containing about 4% ammonia, said method consisting in vaporizing liquid ammonia and leading the same in vacuo and at near freezing point of ammonia to meet said mixture in counter current, thereby separating the ammonia from said mixture.

In testimony whereof I affix my signature.

GEORG FRIEDRICH UHDE.